(12) United States Patent  (10) Patent No.: US 7,832,735 B2
Paykin  (45) Date of Patent: Nov. 16, 2010

(54) SEAL ASSEMBLY WITH PROTECTIVE FILTER

(75) Inventor: Alex Paykin, Buffalo Grove, IL (US)

(73) Assignee: SKF USA Inc., Elgin, IL (US)

( * ) Notice: Subject to any disclaimer, the term of this patent is extended or adjusted under 35 U.S.C. 154(b) by 259 days.

(21) Appl. No.: 11/306,794

(22) Filed: Jan. 11, 2006

(65) Prior Publication Data

US 2007/0158917 A1 Jul. 12, 2007

(51) Int. Cl.
*F16J 15/32* (2006.01)

(52) U.S. Cl. .................. 277/568; 277/550; 277/918

(58) Field of Classification Search .......... 277/562, 277/568, 572, 550, 551, 576, 918
See application file for complete search history.

(56) References Cited

U.S. PATENT DOCUMENTS

| | | | | |
|---|---|---|---|---|
| 2,180,134 A | * | 11/1939 | Baker et al. ............. | 384/484 |
| 3,206,216 A | * | 9/1965 | Crook ................. | 277/637 |
| 3,554,562 A | * | 1/1971 | Davis, Jr. .............. | 277/502 |
| 4,026,563 A | | 5/1977 | Bainard | |
| 4,141,562 A | | 2/1979 | Wu | |
| 4,182,475 A | * | 1/1980 | Freund ................ | 229/5.7 |
| 4,438,936 A | | 3/1984 | Schlegel | |
| 4,532,856 A | * | 8/1985 | Taylor ................ | 92/168 |
| 4,867,043 A | * | 9/1989 | Antkowiak ............ | 92/165 R |
| 5,056,799 A | | 10/1991 | Takenaka et al. | |
| 5,144,882 A | * | 9/1992 | Weissgerber ........... | 92/87 |
| 5,271,629 A | | 12/1993 | Dahlhaus et al. | |
| 5,492,416 A | | 2/1996 | Gabelli et al. | |
| 5,501,469 A | * | 3/1996 | Ducugnon et al. ........ | 277/551 |
| 5,509,666 A | * | 4/1996 | Abraham et al. ......... | 277/562 |
| 5,533,737 A | | 7/1996 | Borowski | |
| 5,687,972 A | | 11/1997 | Petrak | |
| 5,996,542 A | | 12/1999 | Bathurst | |
| 6,105,789 A | * | 8/2000 | Boast ................. | 210/495 |
| 6,123,338 A | | 9/2000 | Edelmann et al. | |
| 6,199,869 B1 | | 3/2001 | Furuyama et al. | |
| 6,257,587 B1 | | 7/2001 | Toth et al. | |
| 6,357,751 B1 | * | 3/2002 | Rentschler ............ | 277/353 |
| 6,461,557 B1 | * | 10/2002 | Boast et al. ............ | 264/257 |
| 6,702,294 B2 | | 3/2004 | Sassi | |
| 6,719,298 B2 | * | 4/2004 | Riedl et al. ............ | 277/435 |
| 7,147,229 B2 | * | 12/2006 | Madigan .............. | 277/551 |

FOREIGN PATENT DOCUMENTS

GB 1453122 * 10/1976

* cited by examiner

*Primary Examiner*—Alison K Pickard
(74) *Attorney, Agent, or Firm*—Vedder Price P.C.

(57) ABSTRACT

A fluid seal assembly including a specialized protective filter unit which is adapted for use with a fluid seal, as well as to the combination of a protective filter unit with an associated seal unit to form a complete seal assembly. The seal provides increased reliability, particularly in those specialized seals wherein high internal pressure and the possibility of particulate contaminants are present.

6 Claims, 5 Drawing Sheets

SEAL ASSEMBLY WITH PROTECTIVE FILTER

BACKGROUND OF THE INVENTION

The present invention relates generally to fluid seal assemblies, and more particularly, to the combination of fluid seal units with specialized protective filter units, whereby a seal assembly may be provided which will operate in an improved, trouble-free manner in use. The invention relates, in one aspect, to a specialized protective filter unit which is adapted for use with a fluid seal, as well as to the combination of a protective filter unit with an associated seal unit to form a novel seal assembly. The invention provides a seal of increased reliability, particularly in those specialized seals wherein high internal pressure and the possibility of particulate contaminants are present.

Modern fluid seals are extremely versatile in use, and are capable of sealing oil, for example, under varying conditions of pressure and temperature, without leakage, over a life span of millions of machine cycles. A typical oil seal used in a hydraulic circuit application now generally comprises a stiff exterior casing element, such as a metal stamping or the like which has an elastomeric seal lip body bonded thereto. The casing may be partially or entirely surrounded with the elastomeric material for the purpose of locating and mounting the seal within an associated machine part, i.e., in a housing counterbore.

The lip portion of the elastomeric seal body rides over a rotary or reciprocating shaft or one which undergoes both motions in use. In particular, in a number of hydraulic mechanisms, including automotive power steering units, oil or like hydraulic fluid may be maintained within a sealed cavity under extreme pressures, which may range up to 500 to 2,000 psi or more. The seal which retains oil in a cavity forming the interior of such mechanism, usually includes a primary lip, and often also includes one or more auxiliary or excluder lips formed as a part of the primary seal lip, or formed separately and used with another component which is associated with the seal unit in use.

Power steering mechanisms, particularly the rack and pinion type, include a reciprocable shaft or rack having end portions which move into and out of the sealed region, assisted by strong forces which are in turn generated in the hydraulic fluid which the seal is called upon to confine. Existing seal designs are fully capable of retaining such fluid within the sealed region, even under these high pressure conditions, for an extremely high number of cycles, as long as a proper sealing environment is maintained.

Such performance, however, depends on the presence of proper working conditions. For seals to perform in this manner, the sealed part which reciprocates relative to the seal must have a surface finish falling within closely defined limits, and the design of the mechanism must permit a generous supply of fluid to be present at the seal-shaft interface. In many cases, an otherwise satisfactory seal will leak or a sealed part may be seriously scored or otherwise damaged if contaminants present in the fluid to be sealed reach this interface. Thus, in a typical automotive power steering application, if metal chips or other remnants from the machining process find their way into the hydraulic fluid, these particles may lodge between the seal lip and the sealed part. With the passage of time and continual reciprocation of the sealed part, a score or groove may develop in the part to a degree sufficient to cause seal leakage; in some cases the damage is such that not only the seal but also the shaft or other element must also be replaced.

Needless to say, the expense of replacing sealed parts forming portions of a hydraulic mechanism can be considerable, especially where the high cost of skilled labor and the inconvenience of gaining access to the sealed part are considered. Still further, the end user of a product of this sort may perceive an oil leak and/or the requirement for replacing part of an important mechanism to be a reflection of low vehicle quality, with extremely adverse overall consequences for the manufacturers and marketers of the vehicles in question. The same considerations also apply in respect to those suppliers who furnish components or subassemblies to manufacturers and/or assemblers of vehicles.

Consequently, there has been a need for an improved seal system which will, where possible, ensure that failure to provide exceptionally clean individual machine elements will not result in a subsequent seal failure with a concomitant large expense, loss of reputation for quality and in some cases, total failure of expensive, sealed machine parts.

In the manufacture of hydraulic assemblies, including power steering units, it is well known that complex machining operations, including boring, honing, counterboring, drilling, tapping, end facing and other finishing steps, are required. These operations are usually performed in sequence on highly complex, automated machinery. When the machining and finishing cycles are completed, the part is intended to be cleaned so that no chips or other residue from the machining operation remain in the finished part.

However, as in other highly automated and engineered products, there is always a potential for an isolated failure, and as a result there has been a need for a product such as that provided by the present invention, which will further forestall the possibility of such failure, and preferably do so with high reliability at low cost.

According to the invention a seal system with an improved form of protective filter unit and wiper lip is provided, in which a protective filter unit is used in tandem with an existing high pressure seal, with the filter being positioned so that it will entrap whatever filings or scrap may be present in the fluid and either retain them on the face of the seal or confine them to an area wherein they are not wedged by a strong hydraulic action between the seal lip and the reciprocable part.

In this connection, it will be appreciated that modern hydraulic seals are designed in such a way that, as the pressure in the sealed cavity rises, this pressure is exerted around the outer periphery of the elastomeric seal lip body, and this in turn applies an increased radial compressive sealing load through the elastomer to the surface of the sealed part. In other words, as hydraulic pressure tending to cause leakage rises, the sealing force generated at the sealing lip-machine element interface rises correspondingly to offset this tendency or potential to leak. Thus, the seal is basically not affected by pressure.

According to the present invention, improved filter elements are provided which are capable of separate manufacture, but insertion in use in tandem with existing seals to form a novel seal system and sealed mechanism.

In view of the failure of prior art seals to provide wholly satisfactory contaminant reduction and/or control action presently required of hydraulic mechanisms, including power steering units, it is an object of the present invention to provide an improved protective filter assembly for use with a seal to form a sealed hydraulic mechanism.

Another object of the invention is to provide a combination novel protective filter unit and fluid seal assembly capable of preassembly and strong retention as a unit before during and after being inserted in a portion of the sealed mechanism, so that it is unaffected by variations of pressure and temperature.

A further object is to provide a seal assembly which includes an operationally integral filter unit adapted to protect the so-called oil side of the seal from contamination by fluid-borne shavings, or other abrasive residues.

Another object of the invention is to provide a protective filter unit for an oil seal, which filter unit is made from readily available materials by existing technology and which may therefore be mass produced at low cost.

A still further object of the invention is to provide a protective filter unit for a seal assembly which includes a ring or casing adapted for registration and interfitting with an associated seal unit and which includes, in addition to the ring or casing, a radially inwardly extending protective filter screen affixed to the ring or casing and a wiper lip on the inside diameter of the seal.

Yet another object of the invention is to provide a protective filter unit for a fluid seal, which filter unit includes an outer support ring able to be affixed to the casing of an associated seal unit, and having an excluder lip and a second filter on its inner diameter, in flexible contact with a shaft, with a filter means in between the inside and outside diameters to prevent the associated seal from contamination by particles in the sealed fluid.

It is also an object of the invention to provide a seal assembly which includes a protective filter unit, and a high pressure seal assembly which includes a casing and an elastomeric seal body, with the casing and a portion of the seal body cooperating to form a permanent mounting surface for the filter unit, and wherein the filter unit includes an exterior casing unit with portions of the filter unit and the seal casing being lockingly engageable with each other whereby the filter and the oil side wiper lip may be permanently located with respect to the remainder of the seal.

A still further object of the invention is to provide a multipart seal assembly which includes one form or another of filter element, a seal element permanently affixable to the filter unit, and an auxiliary element which includes an anti-extrusion or backup support unit for the elastomeric primary seal lip body of the seal element, with an auxiliary or excluder lip having portions engaging the interior surface of the sealed region.

A still further object of the invention is to provide a sealed mechanism which includes a housing, a machine element having a part reciprocable into and out of the housing and a composite seal assembly for the housing and the reciprocable part, with the seal assembly including a primary seal unit having a casing and an elastomeric seal lip portion, a protective filter unit disposed axially inwardly of the primary seal unit and including a filter element, with the seal assembly further including at least one auxiliary or excluder lips, with a backup or pressure absorbing element for portions of the body of the primary seal lip.

SUMMARY OF THE INVENTION

The foregoing and other objects and advantages of the invention are achieved in practice by providing a seal assembly for a shaft wherein a protective filter unit includes an annular outer casing adapted to be lockingly positioned on a radially inner surface of a fluid seal unit, and having a filter element extending radially inwardly of the outer casing unit, with an excluder or scraper lip or the like extending inwardly from the innermost position of the filter unit and contacting the shaft.

The exact manner in which the foregoing and other objects and advantages of the invention are achieved in practice will become more clearly apparent when reference is made to the following detailed description of the preferred embodiments of the invention set forth by way of example, and shown in the accompanying drawings, wherein like reference numbers indicate corresponding parts throughout.

DESCRIPTION OF THE PREFERRED EMBODIMENTS OF THE INVENTION

Figure 1:
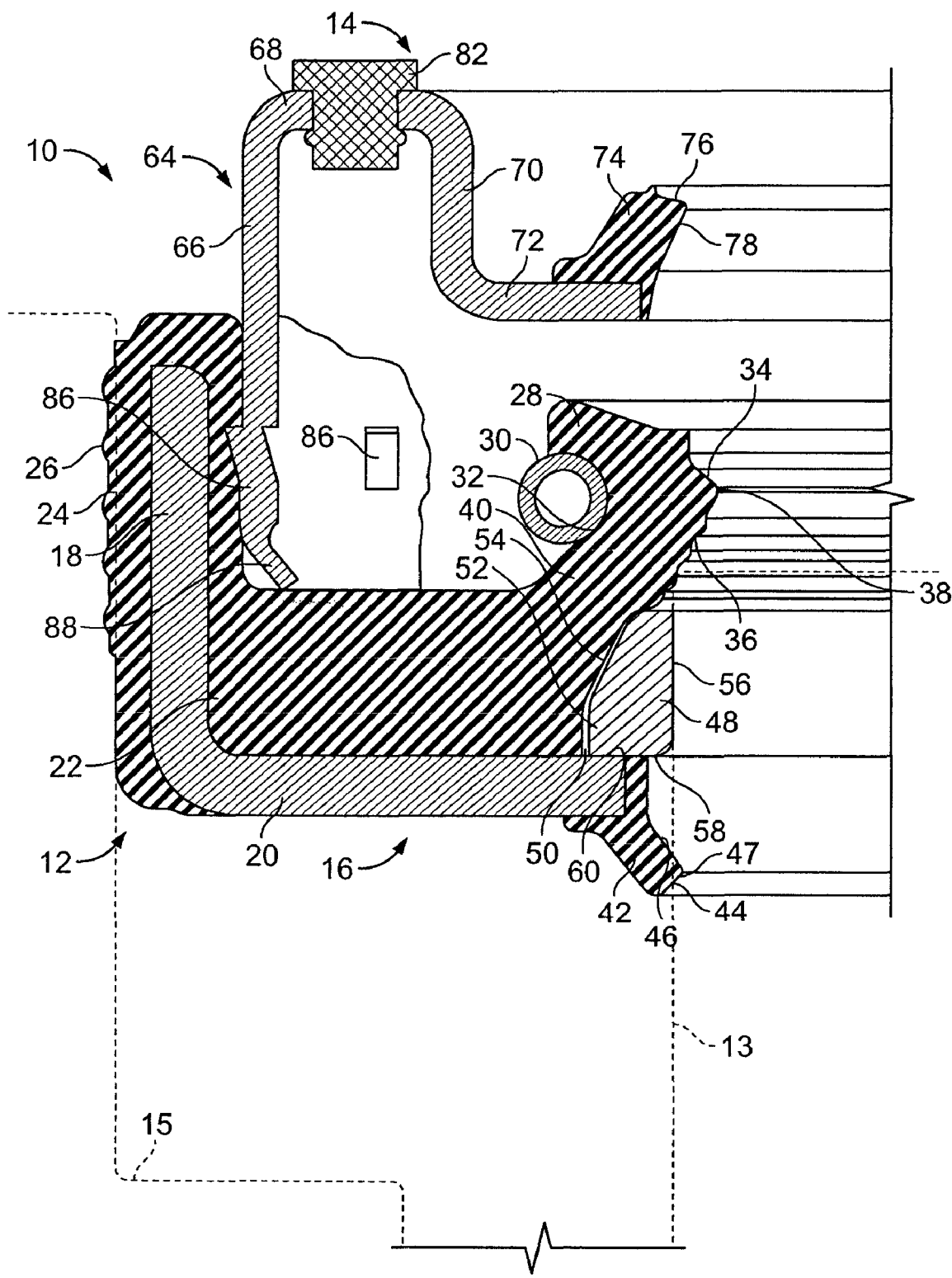
FIG. 1 is a vertical sectional view of a portion of the composite oil seal of the invention, showing one part of the filter and excluder portion locked in place within an associated high pressure seal and showing the counterbore and the shaft in phantom lines.

While the preferred form of fluid seals shown are only examples of the form the seals will ultimately take, other modifications or versions of the described embodiments will occur to those skilled in the art.

Referring now to the drawings in greater detail, there is shown a form of a composite oil seal assembly generally designated 10, which comprises a high pressure seal generally designated 12 and a filter assembly generally designated 14. The fluid seal 10 is designed to hold liquid within a region defined by a shaft and a counterbore, shown at 13 and 15 in phantom lines. The high pressure seal 12 has a metal casing generally designated 16, and this casing comprises an axial flange 18, radial flange 20, and an elastomeric seal body portion generally designated 22. The seal body extends around the axial flange 18 of the casing 16 and forms a rubber outside diameter (OD) 24 preferably having plural external ribs 26 thereon.

The high pressure primary seal lip body 28 includes a garter spring 30 disposed in a garter spring groove 32. The frusto-conical oil side surface 34 of the seal lip body 28 meets the frusto conical, ribbed air side surface 36 of the seal lip body 28 at a seal band 38. A flex portion 40 of the seal lip body 28 ensures that the seal band will remain in contact with the shaft. An air side excluder lip 42 is affixed to the radial flange 20 of the high pressure seal, and this excluder lip 42 is defined by a pair of surfaces 44, 46 which meet at the seal band 47.

A nylon or like stiffener 48, which is sometimes referred to as a back up ring, is received within a pocket 50 in the seal body 22 of the primary lip. The stiffener 48 includes an axially outer surface 52, a tapered outer surface 54, an axially extending inner surface 56 and a backing surface 58. The radially extending rear edge portion 60 of the pocket 50 holds the stiffener in its axial position even in the presence of high internal pressures.

The oil side (to the top in FIG. 1) of the auxiliary rod wiper and filter assembly 14 is shown to include a casing in the form of a stamping or casing generally designated 64, which includes an axial flange 66, an outer radial flange 68, an optional, inner offset flange 70 and an inner most radial flange 72. The rod wiper 74 is shown to comprise a wiping surface 76 and another surface 78. The rod wiper 74 or its equivalent is an essential feature of the invention, because it keeps any debris such as filings or other abrasive material from passing beneath the excluder to the seal band 38.

Referring again to the axial flange 66 of the excluder portion, this includes a plurality of barbs 86 preferably equally spaced circumferentially and located axially near the end portion 88 of reduced thickness in the casing 66. These barbs 86 extend into and make a strong, non-removable connection between the high pressure seal 12 and the filter unit 14.

Figure 2:
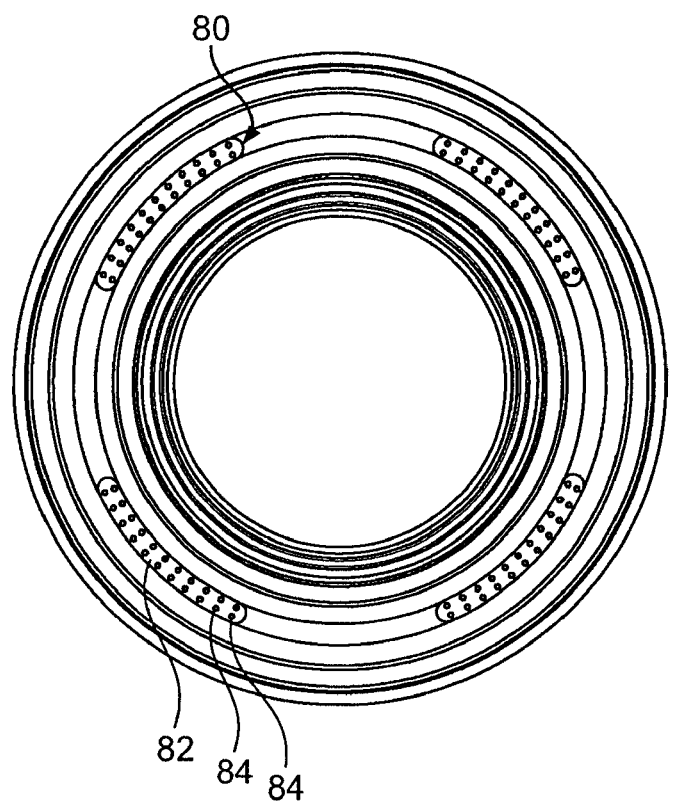
FIG. 2 is an end elevational view of the seal assembly of FIG. 1.

Referring now to FIG. 2, there is shown a plurality of oval slots generally designated 80 which in this case are filled with a 40- to 60-micron mesh material 82. This material could be bonded or adhesively secured in place (FIG. 1) or held by very small fasteners (FIG. 2).

Referring now to use of the composite seal of the invention, the first step is to insert the back up ring 48 in place within the pocket 50. The auxiliary casing 66 is then inserted within the seal body 22 until the reduced thickness portion 88 of the casing 66 is in contact with the inner surface of the seal body 22. At this point, the barbs 86 on the casing 66 have fully engaged and have formed a tight connection with the seal body 22. This positions the seal assembly 12, 14 in the relation shown in FIG. 1.

One embodiment of the seal shown in FIG. 2 contains the form of elongated slots 80 having the shaped, form-fitting piece of filter material 82 disposed therein. The tiny openings—40 to 55 microns by way of example—permit passage of fluid such as oil or power steering fluid to pass but exclude any potentially damaging contaminants from entering this sealed region. In addition, the inclined surface 7b of the rod wiper 74 acts on the shaft and will pick up any particles of abrasive material left on the wiper lip 74 and retain them on the surface 76. This prevents such abrasive material from passing under the oil side lip 34 and entering the seal band area 38. The abrasive particles either fall to the ID or remain on the filter screen, but in any case do not pass to the seal band 38 because of the wiper lip 74.

While prior art sealing units have to a certain extent been successful in collecting grit or other abrasive material about the center of the seals, such seals have not been fully effective, since such seals did not afford a flexible lip in contact with the shaft to make certain that abrasive particles escaping from the screen did not pass to the oil side primary lip.

Figure 3:
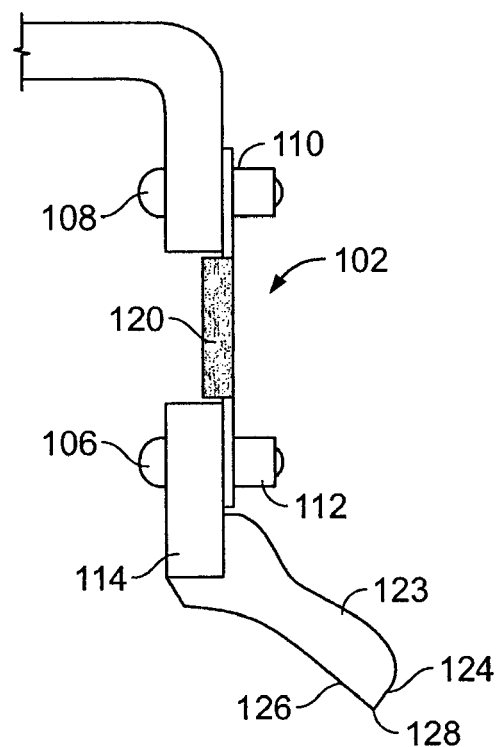
FIG. 3 is a fragmentary sectional view showing another form of filter and filter retainer and the excluder lip on the inside diameter of the filter unit.
Figure 4:
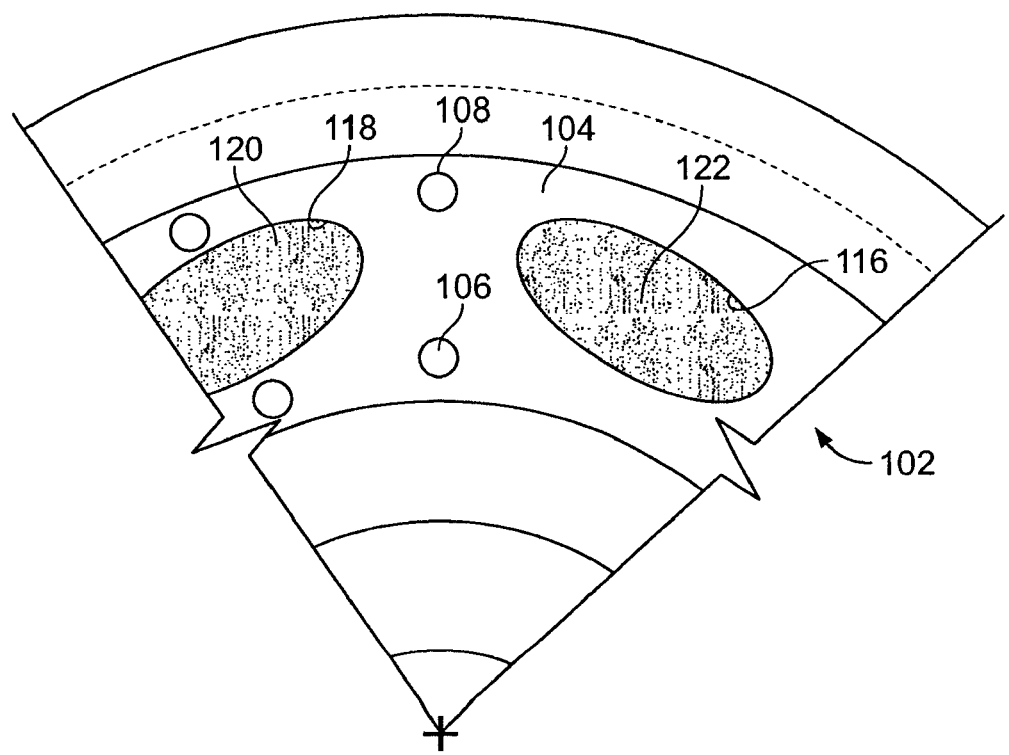
FIG. 4 is a rear elevational view of the filter lip of FIG. 3.

Referring now to FIGS. 3 and 4, a modified form of invention is shown, which includes a metallic or plastic molded construction shown in FIGS. 3 and 4. Here, a structure generally designated 102 comprises a thin, flat, impermeable sheet 104 of perhaps 0.010 inches thick, which extends between the opening 116, in the sheet 104. The thin sheet 104 is held by fasteners 106, 108 which are adapted to snap into openings 110, 112 in the radial flange 114 of a filter unit generally designated 102.

Such a unit includes a plurality of relatively large openings 116, 118 for the screen units 120, 122 preferably having a mesh size of 35 to 60 microns. The seal 102 includes an excluder lip body 123 with a surface 124 acting to keep contaminants from entering the sealed region from beneath the seal band 128 formed in part by the surface 126.

Figure 5:
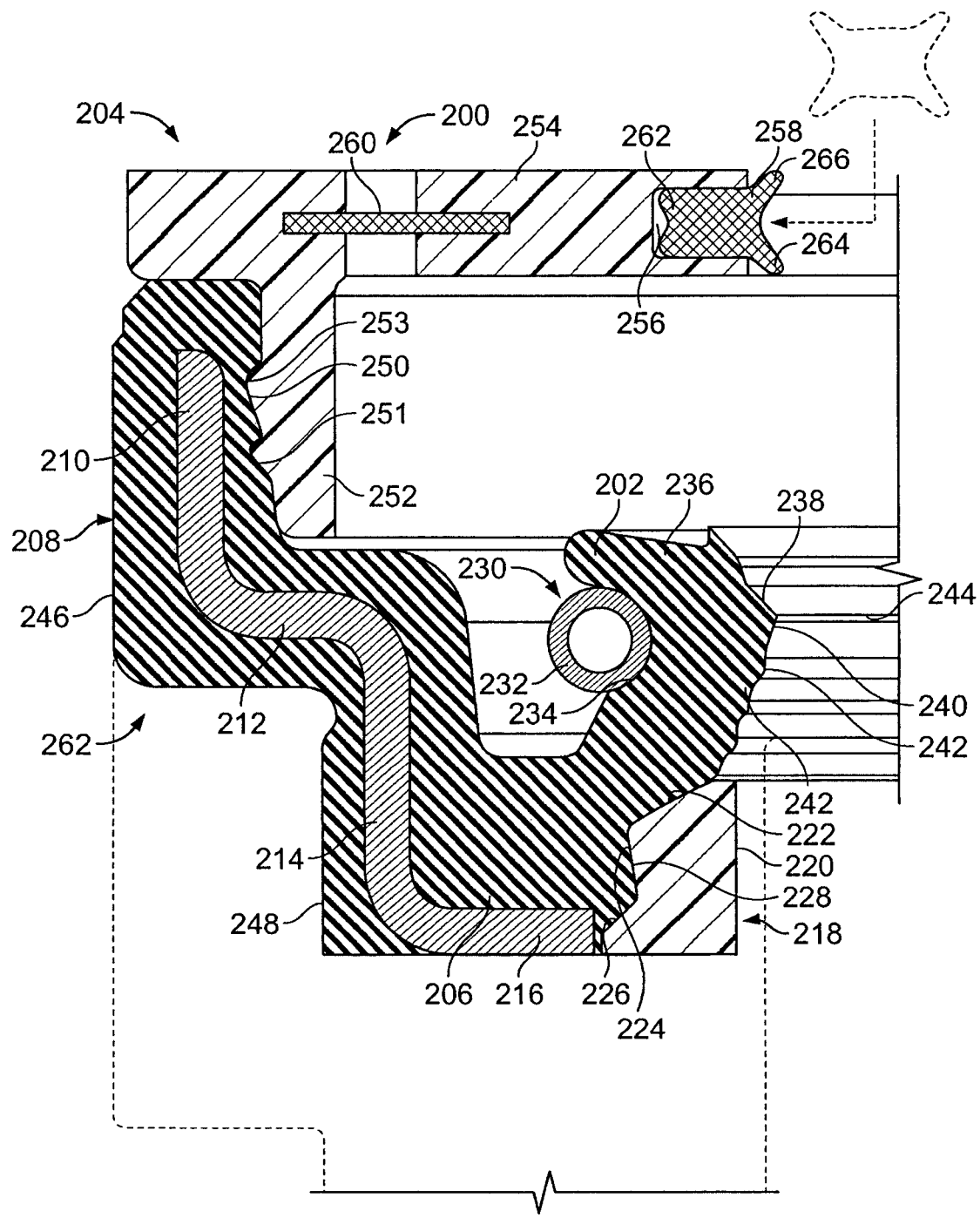
FIG. 5 is a vertical sectional view of another form of seal assembly, showing a still further form of filter and excluder element of the invention.

Referring now to FIG. 5, a further embodiment of the invention is shown. Here, the seal assembly generally designated 200 is shown to include a primary lip arrangement 202 and an excluder/filter combination generally designated 204. Here, in FIG. 5, the seal body itself comprises an annular seal body 206, a convoluted casing or stamping generally designated 208 and includes an axial flange 210, a first radial flange 212, a second axial flange 214 and an innermost radial flange 216.

A convoluted anti-extrusion insert generally designated 218 importantly includes a radially inner surface 220, a first inclined surface 222 and a reversely inclined surface 224; it also includes an outermost inclined surface 226. The contours of the anti extrusion insert 218 correspond to those surfaces on the contoured pocket 228. The angles of inclination on the anti-extrusion surfaces 222, 224 are such that increased pressure causes the anti extrusion insert to maintains its shape even under high pressures.

The portion generally designated 230 of the seal includes a lip body 236, a garter spring 232 seated in a spring grove 234. The lip 236 also includes a oil side surface 238, an air side surface 240 which includes plural ribs 242, and the surfaces 238, 240 meet along a locus 244 defining a seal band. The other significant feature, in addition to the surfaces 246, 248 which meet the counterbore shown in phantom lines, include a seal body having a contoured pocket 250. This pocket 250 is shaped so as to receive the bumps or projections 251, 253 on the axially extending portion 252 of a mounting flange 252 for the filter assembly 204.

This assembly 204 includes a radially inwardly extending plastic portion 254, a radially inner pocket 256, and an intermediate portion in the form of a bonded-in screen or cloth 260. A small, so-called quad ring 258 of filter material is disposed within the pocket 256, and the upper portions 262 of this quad ring project against the sidewalls of the pocket to make sure that it is strongly positioned and held in place. The remaining finger portions 264, 266 of the quad ring extend radially inwardly so as to somewhat snugly engage the shaft to prevent any particles from reaching the oil surface side of the seal 238 and especially the seal band 244.

Figure 6:
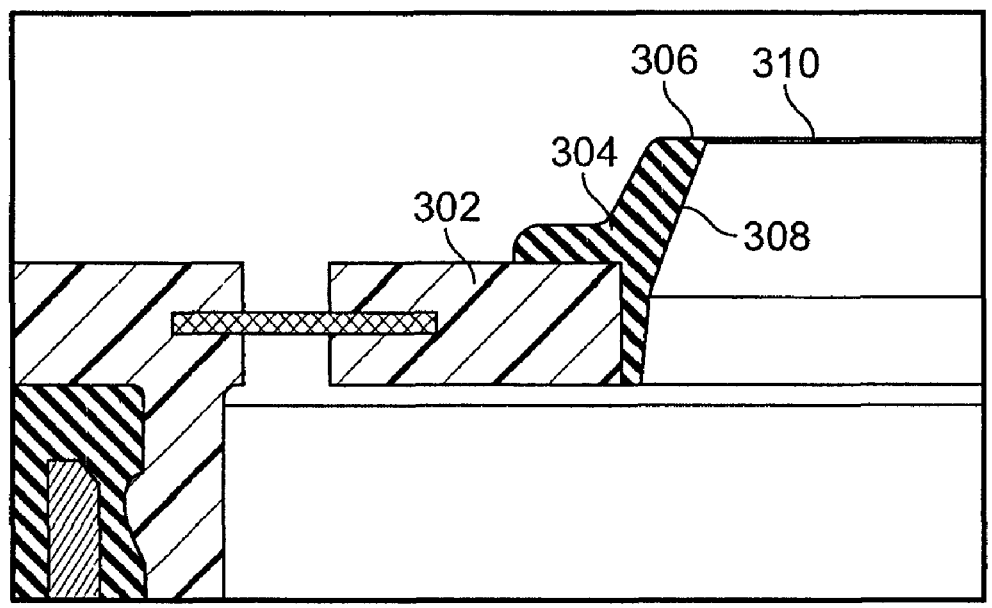
FIG. 6. is a fragmentary vertical sectional view of a portion of the filter and excluder lip of another form of seal.

Referring now to FIG. 6, this figure shows a construction which is identical to that of FIG. 5, except for details of the innermost portions of the second part. Here, the radially innermost flange 302 includes a scraper lip 304 having surfaces 306, 308 meeting to define an auxiliary seal band 310. This scraper lip 304 snugly engages the shaft over which the seal is placed, and prevents any debris of any kind from passing to and under the lip such as the lip 244 (FIG. 5).

Figure 8:
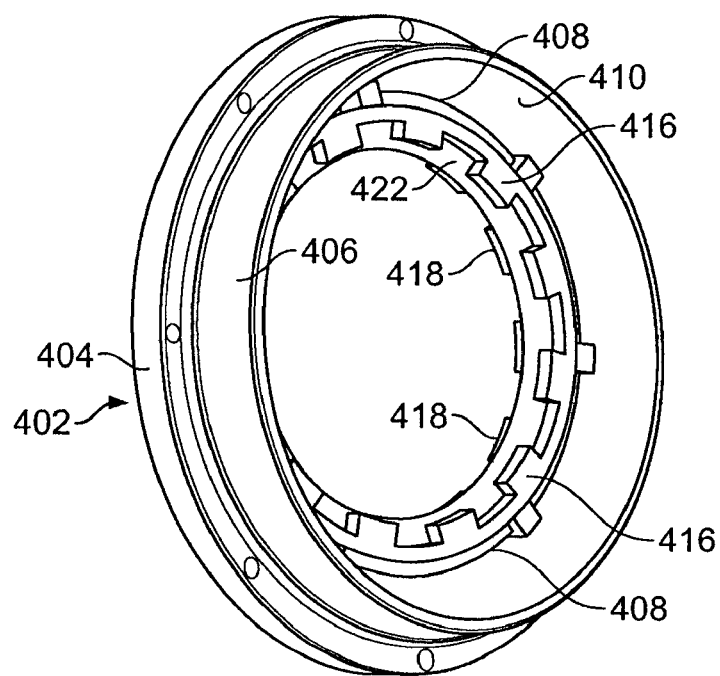
FIG. 8 is a perspective view of the filter and excluder element of FIG. 7.
Figure 7:
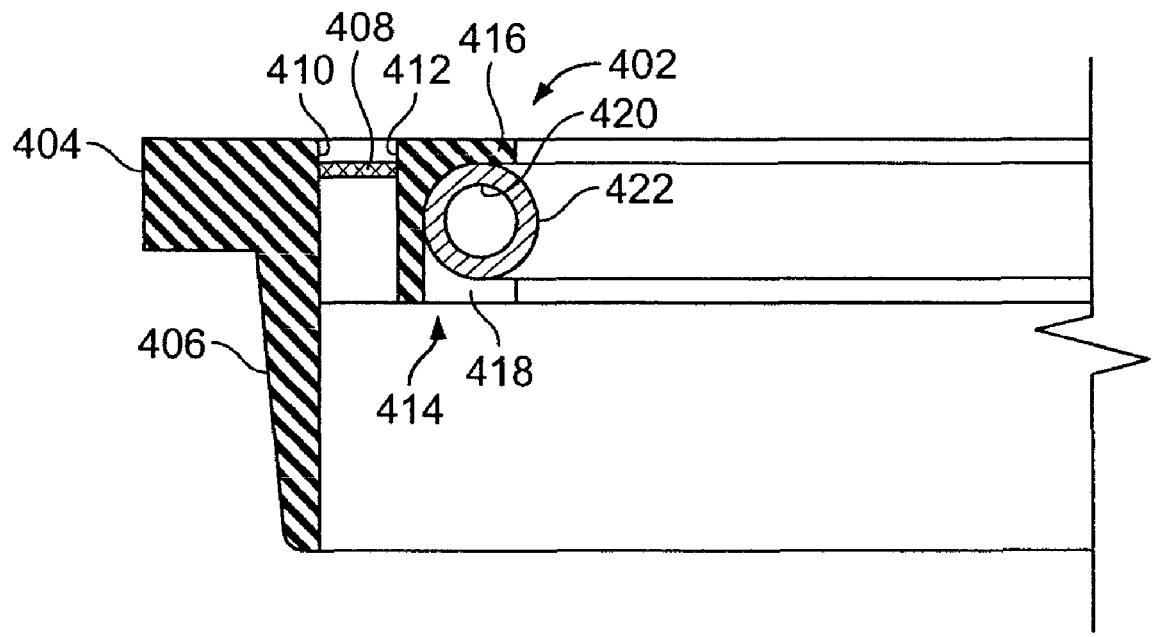
FIG. 7 is a vertical sectional view of a position of another form of seal and showing a filter element and an O-ring excluder element.

FIGS. 7 and 8 show a still further embodiment of the invention. Here, an insert generally designated 402 is designed to cooperate with an outer primary seal (not shown); the insert 402 includes an outmost ring 404 and an axial flange 406. Inside the flange 406 is a radially extending filter unit 408, extending between the outer and inner parts, 410, 412 of an O-ring holder generally designated 414.

The o-ring holder 414 includes a number of outer fingers 416 which are radially and axially offset from inner figures 418. Consequently, the O-ring 420 is entrapped between the offset fingers, these fingers 416, 418 hold the O-ring in place against a reciprocating shaft (not shown). The O-ring 420 is preferably made from a porous plastic material acting as a fine mesh filter; and is the functional equivalent of the 40-60 micron mesh referred to above.

It will thus be seen that the present invention provides a number of constructions that do away with the problem of machining debris entering into and under the primary lip of a high pressure seal and thus protect and extend the life expectancy of a power steering or other hydraulic mechanism.

What is claimed is:

1. A fluid seal assembly including a fluid seal unit having an elastomeric seal body and a seal band defined by the meeting of air and oil side surfaces, and a high pressure support ring received in a pocket in said seal body said fluid seal being adapted to seal a reciprocable member under high pressure conditions, and a protective filter unit for said fluid seal unit, said protective filter unit lying on the oil side of said fluid seal unit, said fluid seal unit also including an axially extending casing unit having a stiff elastomeric outside diameter surface adapted to be snugly received within a seal counterbore, and an inside diameter elastomeric surface, said protective filter unit having an axially extending portion, a radially extending portion including a first, dimensionally fixed fine mesh filter screen, located within said radially extending portion, and a second, radially innermost excluder means having a relatively rigid member supporting said excluder means and being adapted to contact said reciprocable member in particulate excluding relation, said axially extending portion of said protective filter unit snugly engaging said inside diameter elastomeric surface lying on said axially extending inner portion of said casing unit, wherein said radially innermost excluder means is adapted to contact said reciprocable member in particulate excluding relation comprises a groove in said radially innermost means having a quad ring disposed therein, said quad ring being made from a fine mesh filter medium.

2. A fluid seal assembly including a fluid seal unit having an elastomeric seal body and a seal band defined by the meeting of air and oil side surfaces, and a high pressure support ring received in a pocket in said seal body said fluid seal being adapted to seal a reciprocable member under high pressure conditions, and a protective filter unit for said fluid seal unit, said protective filter unit lying on the oil side of said fluid seal unit, said fluid seal unit also including an axially extending casing unit having a stiff elastomeric outside diameter surface adapted to be snugly received within a seal counterbore, and an inside diameter elastomeric surface, said protective filter unit having an axially extending portion, a radially extending portion including a first, dimensionally fixed fine mesh filter screen, located within said radially extending portion, and a second, radially innermost excluder means having a relatively rigid member supporting said excluder means and being adapted to contact said reciprocable member in particulate excluding relation, said axially extending portion of said protective filter unit snugly engaging said inside diameter elastomeric surface lying on said axially extending inner portion of said casing unit, wherein said protective filter comprises a plastic unit with an axial flange having a snug fit with said inside diameter elastomeric surface and an inner diameter comprising a plurality of fingers, some of said fingers lying in a first plane and the other of said fingers lying in a second plane spaced from and parallel to said first plane, said fingers retaining a microporous scraper/filter element.

3. A fluid seal assembly as defined in claim 2 wherein said fingers retain an O-ring made from a microporous material.

4. A fluid seal assembly for sealing a reciprocable member under high pressure conditions, said fluid seal assembly including a rigid casing unit having radially and axially extending flanges, an elastomeric portion formed radially inside said axial flange, a seal body including a pocket in said body for receiving a back-up ring, a sealing lip having a seal band where air and oil side frusto-conical surfaces meet, and a protective filter unit associated with said fluid seal, said protective filter unit lying on the oil side of said fluid seal, said protective filter including an axial flange portion of said protective filter non-removably received by said elastomeric portion of said axial flange, a radially extending portion having a first, fine mesh filter forming a part thereof, and a second, radially inwardly directed means adapted to contact said reciprocable member in particulate excluding relation, wherein said radially inwardly directed means includes a groove in said radial portion, said groove having a quad ring therein made from a fine mesh filter medium.

5. A fluid seal assembly for sealing a reciprocable member under high pressure conditions, said fluid seal assembly including a rigid casing unit having radially and axially extending flanges, an elastomeric portion formed radially inside said axial flange, a seal body including a pocket in said body for receiving a back-up ring, a sealing lip having a seal band where air and oil side frusto-conical surfaces meet, and a protective filter unit associated with said fluid seal, said protective filter unit lying on the oil side of said fluid seal, said protective filter including an axial flange portion of said protective filter non-removably received by said elastomeric portion of said axial flange, a radially extending portion having a first, fine mesh filter forming a part thereof, and a second, radially inwardly directed means adapted to contact said reciprocable member in particulate excluding relation, wherein said protective filter comprises a plastic body with an axial flange having a slight taper for being press-fit into said axial flange of said seal unit, said plastic body having a plurality of fingers, some of said fingers lying in a first plane and the other of said fingers lying in a second plane spaced from and parallel to said first plane, said fingers retaining a microporous excluder in the form of a scraper/filter.

6. A fluid seal assembly as defined in claim 5 wherein said fingers retain an O-ring made from a microporous filter material.

* * * * *